Dec. 12, 1950        C. P. PEPPER        2,533,952
CLUTCH SPRING ANCHORAGE
Filed Dec. 31, 1948
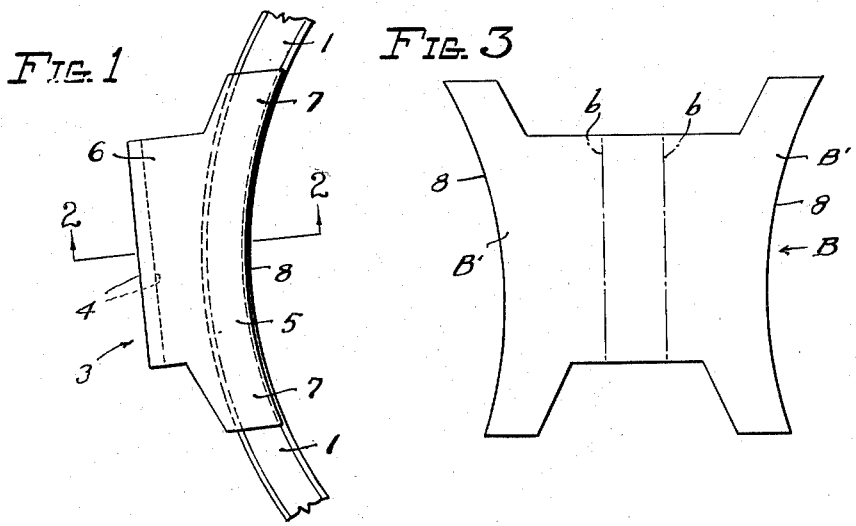
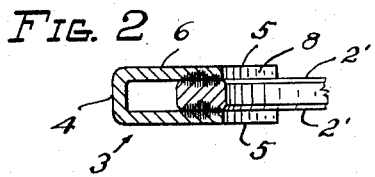
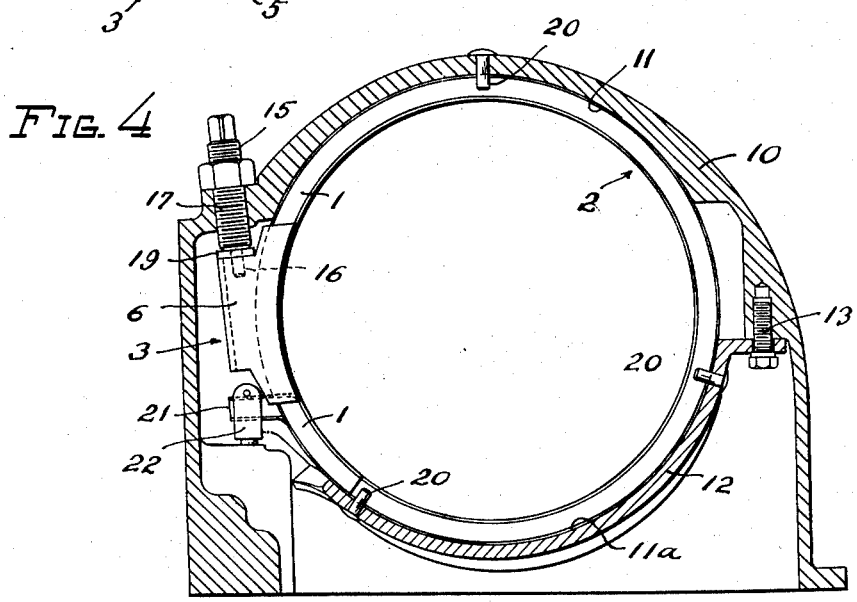
Carl P. Pepper, INVENTOR.
BY George M. Souk
ATTORNEY Patented Dec. 12, 1950

2,533,952

UNITED STATES PATENT OFFICE 2,533,952

CLUTCH SPRING ANCHORAGE

Carl P. Pepper, Plainfield, Ind., assignor, by mesne assignments, to The Marquette Metal Products Company, Cleveland, Ohio, a corporation of Ohio Application December 31, 1948, Serial No. 68,666

3 Claims. (Cl. 267—1)

The invention relates to an improved anchorage for a torque transmitting helical spring designed to expand or contract so as frictionally to grip a generally circular part to transmit the torque. Such springs may operate as clutches or brakes, the spring illustrated herewith being adapted to serve as a brake on a rotary reactance element of a planetary gear mechanism concentric with the spring.

An object is to provide a strong spring anchorage for a heavy load carrying coil of the spring, which anchorage will avoid having to weaken the spring by distorting a portion of an end coil out of circular form which weakening happens when the anchorage is made by forming a conventional toe or eye-loop on the end of the coil.

Another object is to provide a strong anchorage for a load end coil of a helical torque transmitting spring such that the end coil may be readily secured by simple cooperating means against movement axially of the spring while being free to move radially to and from drum-gripping position.

A further object is to provide a spring anchor element adapted to be secured to the spring as by brazing or welding, and wherein the anchor element is self-retaining on the spring during the brazing or welding operation.

A further object is to provide a spring anchorage which is generally symmetrical with reference to a coil to which attached, so as to apply a torque load to the coil parallel and in balanced relation to its helical working axis.

Other objects will become apparent from the following description of the preferred form shown in the drawing wherein:

Fig. 1 is a side elevation of the improved anchor element and a short portion of the associated high-load-carrying spring coil; Fig. 2 is a detail sectional view as indicated on Fig. 1; Fig. 3 is a plan view of a sheet metal blank from which the anchor element hereof may be formed, and Fig. 4 is an end view of the anchored spring in mounted position in a suitable housing, the view showing cooperating anchor-engaging means on the housing.

Referring to Figs. 1 and 2, a short portion 1 of the helical coil spring 2 of Fig. 4 has secured to it the anchor element 3 hereof shown as comprising an openly folded U-shaped piece of sheet metal having a connecting base portion 4 and approximately parallel sides or wings 5 which extend in embracing relation to opposite side faces 2' of the coil spring and are secured rigidly thereto.

The base 4 as shown extends generally tangentially of the coil 1 to provide in conjunction with the adjacent free portions of the sides a hollow or tubular radial lug 6 on the spring open at both ends. Preferably the sides 5 are arcuate and may extend along each face of the coil beyond opposite ends of the lug generally conforming to the contour of the spring as illustrated.

Such an anchor element 3 can be made inexpensively from the sheet metal blank B, Fig. 3, when the two wing-forming sides B'' are bent approximately parallel to each other along the axes b. When the blank is folded the arcuate portions of the sides B' are preferably brought together so that there is less distance between those spring-embracing portions than the thickness of the spring stock parallel to the spring axis. That enables the sides of the anchor to frictionally and tightly grip the spring stock prior to fastening the anchor securely to the spring. The circular edge surfaces 8 can be easily nearly aligned with the inner perimetral surface of the spring in order properly to locate the anchor even without use of a jig or at least with a very simple one. If an anchor lug of any of the various conventional forms is attached to a clutch spring by brazing in a furnace then some securing means must be applied in order to hold the anchor in place while the spring and anchor assembly is passing through the brazing furnace. The self-retaining feature of the present anchor thus has an important advantage particularly when brazing is used to secure it to the spring. Additionally one of the portions 5 lies between and spaces apart the end coil and next adjacent coil thereby tending to prevent spread of the brazing metal to adjacent defining surfaces of the coils such as could lock the coils together and prevent their desired individual action.

The anchor element 3 may be spot or continuously welded to the spring as illustrated in Fig. 2 instead of being brazed thereto.

If the helical spring 2 has its coil closely wound then one side portion 5 of the anchor device would operate to hold the coil portion 1 in spaced relation to the coil adjacent to it by reason of the resulting strain in the spring. Thus the anchor would ordinarily be self-retaining on the spring in proper position for attachment by brazing even without having the sides 5 formed in spring-clasping or strained embracing relation to the spring stock.

Referring to Fig. 4, the non-rotatable housing 10 has a cylindrical helical-spring-positioning generally circular pocket 11, 11a formed in part by a separate housing member 12 attached as by screws 13 (one shown) to one side wall of the housing part 10. The helical spring 2 in order to serve as a brake on an external drum (not shown) rotating within said spring, has its high load transmitting coil portion 1 secured to the housing through the intermediary of the anchor 3 so that the spring cannot turn bodily or unitarily in the housing. The drum, against which the spring is to act as a brake, rotates clockwise as viewed in Fig. 4. An adjustable screw 15 is shown threaded to the housing in alignment with the appropriate hollow end of the anchor lug 6. The adjusting screw has a reduced diameter portion 16 beyond its threads 17, which portion slidably fits in the elongated slot provided by the adjacent hollow end of the lug to prevent movement of the coil portion 1 axially of the spring while enabling said portion to move radially the necessary amount for gripping and releasing the rotatable drum. A loose thrust or bearing washer or pad 19 is shown between the adjusting screw 15 and the associated end of the anchor lug 6. The rotatable drum is located inside the spring 2 coaxial therewith and supported normally in close relation to but separated from the inner perimetral surface of all the coils when the latter are relaxed against the supporting pocket surfaces 11, 11a. The spring 2 may be additionally axially located in the housing by short positioning pins such as shown at 20, a circumferential series of such pins (one series shown) being located at each end of the spring.

To energize the helical spring 2 into braking relation to the drum, the end coil of the spring opposite the coil portion 1 is shown as bent out to provide a toe 21 in position for engagement with an operating part 22 which may be a hydraulically operated piston or any other actuating device. The piston is moved upwardly to cause the helical spring to contract and grip the drum and downwardly in order to enable the spring to release the drum. As is well known, very little force has to be applied to the energizer end of the spring, hence the outwardly bent toe has adequate strength for transmitting energizing torque. The lug 6 is always held against the thrust washer 19 by the energizing member 22 and toe 21, acting through the various coils of the spring. When the spring is energized, its coils are successively contracted against the drum, and the end coil or high load carrying portion 1 can then move freely radially inwardly with the other coils the slight distance usually necessary in order to contact the brake drum. When the energizing member 22 is moved downwardly into the position shown, the spring coils automatically expand of their own spring force into their inactive positions against the mating positioning pocket surfaces of the housing.

I claim:

1. In combination with a torque-transmitting spring of the character described, an anchor element comprising a U-shaped piece of metal having integral wing portions embracing opposite side surfaces of a coil of the spring and rigidly attached thereto as by welding or brazing.

2. In combination with a torque-transmitting helical spring, an anchor member comprising an openly folded piece of sheet metal having substantially parallel side portions secured rigidly to the associated surfaces of one of the spring coils and an open loop extending radially therebeyond for engagement with a cooperating reactance element having a pilot portion adapted to enter the loop.

3. In combination with a torque-transmitting helical spring of the class described, an anchor element comprising a U-shaped metal member having a base portion spaced from a perimetral portion of an associated spring coil to provide a hollow lug and having superposed portions generally corresponding to the contour of the spring and extending in opposite directions along the spring coil from the body portions on both sides of the spring coil and secured rigidly thereto.

CARL P. PEPPER.

REFERENCES CITED

The following references are of record in the file of this patent:

UNITED STATES PATENTS

| Number | Name | Date |
|---|---|---|
| 444,526 | Norwood et al. | Jan. 13, 1891 |
| 1,338,673 | Cauley | May 4, 1920 |
| 1,875,717 | Forbes | Sept. 6, 1932 |